United States Patent [19]

Loizeau

[11] Patent Number: 4,480,736
[45] Date of Patent: Nov. 6, 1984

[54] TORSIONAL DAMPERS

[75] Inventor: Pierre Loizeau, Ville d'Avray, France

[73] Assignee: Valeo, Paris, France

[21] Appl. No.: 343,578

[22] Filed: Jan. 28, 1982

[30] Foreign Application Priority Data

Feb. 4, 1981 [FR] France .................. 81 02110

[51] Int. Cl.³ .......... F16D 3/14; F16D 3/77; F16D 3/79
[52] U.S. Cl. .............. 192/106.1; 192/70.17; 192/55; 464/77; 464/57
[58] Field of Search ............ 192/106.1, 70.17, 55; 464/77, 62, 61, 57; 188/74, 77 R; 267/181

[56] References Cited

U.S. PATENT DOCUMENTS

| | | | |
|---|---|---|---|
| 305,635 | 9/1884 | Schinneller | 192/55 |
| 1,997,021 | 4/1935 | Spase | 192/106.1 X |
| 2,114,247 | 4/1938 | Davis | 192/106.1 |
| 2,256,496 | 9/1941 | Robinson | 464/57 X |
| 2,597,380 | 5/1952 | Root . | |
| 2,988,187 | 6/1961 | Doble | 192/55 |
| 3,531,068 | 9/1970 | Fischer | 267/181 |
| 3,589,486 | 6/1971 | Kelch | 192/55 X |
| 4,181,208 | 1/1980 | Davis | 192/106.1 |
| 4,210,234 | 7/1980 | Jones | 192/106.1 |

FOREIGN PATENT DOCUMENTS 2315032 1/1977 France .

Primary Examiner—Rodney H. Bonck
Assistant Examiner—David D. House
Attorney, Agent, or Firm—Charles E. Brown

[57] ABSTRACT

A torsional damper comprises two parts mounted to rotate relative to one another against circumferentially acting elastic means disposed between them. These elastic means include at least one elastically deformable arm fastened at one end to one rotating part so as to rotate therewith. Its other end is unrestricted, and is formed with a shoulder whereby it can engage with a shoulder provided for this purpose on the other rotating part. The or each elastically deformable arm and its support are integral parts of an appropriately shaped flange. An application of the torsional damper is to friction clutches for automotive vehicles, for damping torsional vibration.

19 Claims, 18 Drawing Figures

FIG.11
FIG.12
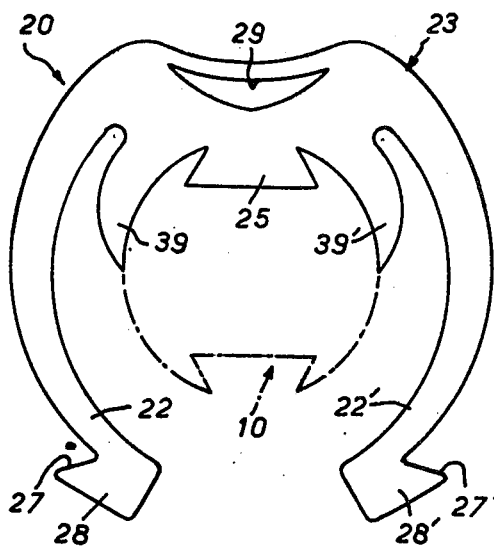
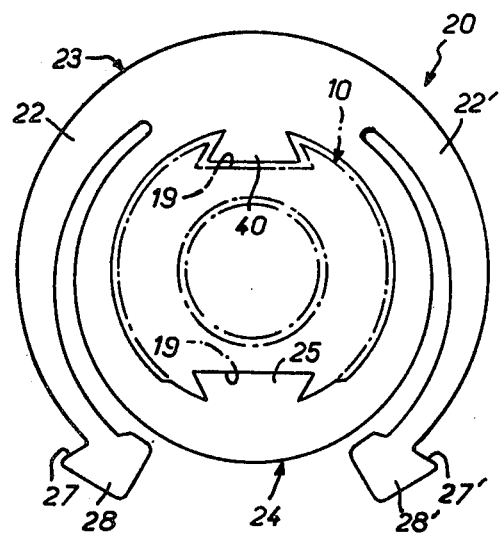
FIG.13
FIG.14
FIG.15
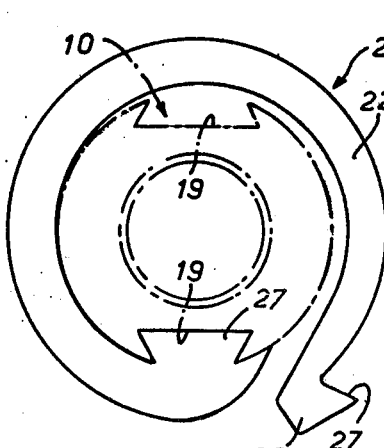
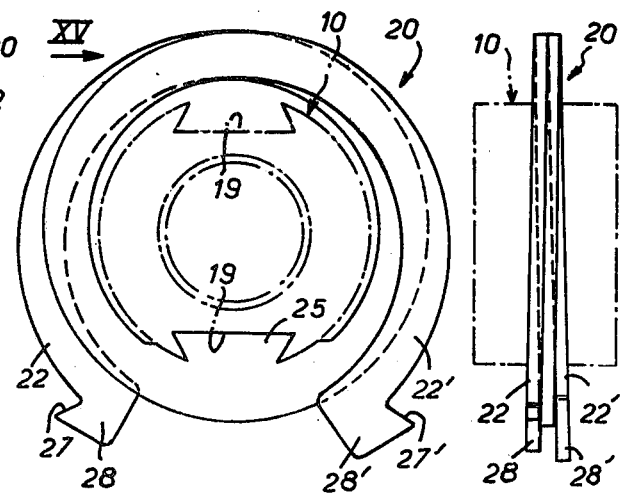
FIG.16
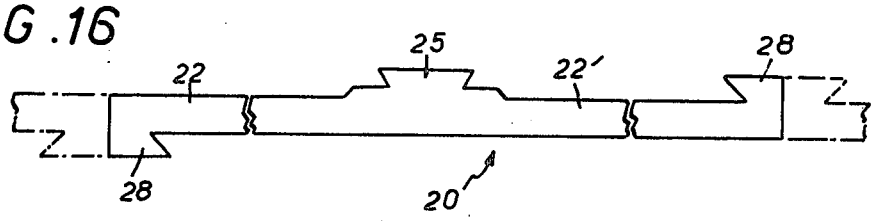

TORSIONAL DAMPERS

BACKGROUND OF THE INVENTION

1. Field of the Invention

The present invention concerns a torsional damper comprising at least two coaxial parts mounted to rotate relative to one another within a defined range of relative angular movement and circumferentially acting elastic means between said parts resisting such relative angular movement over at least part of said range of relative angular movement.

2. Description of the Prior Art

This type of torsional damper is normally incorporated in the design of a friction clutch plate, particularly for automotive vehicles, in which case one rotating part comprises a friction disk designed to rotate with a first shaft, in practice a driving shaft and the motor output shaft in the case of an automotive vehicle, whereas another of said rotating parts is carried on a hub designed to rotate with a second shaft, in practice a driven shaft and the gearbox input shaft in the case of an automotive vehicle.

This type of device is used to permit regulated transmission of rotational torque applied to one of its rotating parts where the other is itself subject to a rotational torque. It is thereby able to filter vibrations which may arise at any point in the kinematic system in which it is incorporated, extending from the motor to the driven road wheels in the case of an automotive vehicle.

In torsional dampers of this type the circumferentially acting elastic means are generally coil springs, extending in a generally tangential direction relative to a circumference of the damper assembly, each located partly in an opening formed for this purpose in a first component forming part of one of the two rotating parts (a flange, for example) and partly in an opening formed for this purpose in one or more other components forming part of the other rotating part (annular guide members, for example).

One problem to be overcome in designing torsional dampers of this type is the need to provide room for these springs in a space which is limited in the radial direction by other design factors and which is already congested, while the number of springs may be large and the springs inevitably weaken the components in which the openings to accommodate them are formed.

It is already known in the art, however, to substitute elastically deformable arms for coil springs in constituting the circumferentially acting elastic means.

Such elastically deformable arms are disclosed, for example, in French Pat. No. 2 315 042, filed June 18, 1975 under Application No. 75 190 48.

However, these elastically deformable arms form part of a special type of hydrokinetic transmission coupling incorporating a clutch mechanism, in which their specific function is to control the operation of a valve. In the transmission system disclosed, the elastically deformable arms are operative for only one direction of rotation of the rotating parts between which they act.

Furthermore, while they are attached at one end to a support connected to one of the rotating parts so as to rotate therewith, they are also positively attached to the other rotating part at their other end. Thus the assembly is designed as a specific unit, requiring special fitting.

This has no connection with the object of the present invention, which is furthermore concerned with a torsional damper, and in particular with a friction clutch plate and not with a hydrokinetic transmission coupling incorporating a clutch facility.

U.S. Pat. No. 2,114,247 is concerned with a torsional damper of the kind to which the present invention relates, and also discloses the use of elastically deformable arms as circumferentially acting elastic means.

In this American patent, each of the elastically deformable arms used is formed by winding into a helix a rod which is substantially square in transverse cross-section. This is a relatively complex operation, in that winding to the required diameter is difficult and expensive. The bulk in the axial direction is also considerable. Moreover, these arms extend continuously from one of the rotating parts concerned to the other, so that they are operative between the rotating parts as soon as relative angular movement occurs between them, and thus for low values of the torque transmitted from one rotating part to the other as well as for higher values of this torque.

Thus the circumferentially acting elastic means between said rotating parts have the same stiffness throughout relative angular movement between them.

In practice, it is beneficial for the circumferentially acting elastic means to be of relatively low stiffness at low values of torque, in particular for good absorbtion of dead point noise with the motor stationary. They should also have relatively high stiffness at higher values of torque, and this is not possible with the arrangement disclosed in U.S. Pat. No. 2,114,247.

By virtue of the relatively large bulk in the axial direction of each of the two elastically deformable arms used, the arms cannot be easily staggered in the axial direction without increasing the axial dimension of the assembly significantly, and in practice unacceptably.

Furthermore, were they to be axially staggered in this way a significant radial component of elasticity would result.

In practice, they are disposed axially in the same transverse plane, and thus can only extend circumferentially in the same direction.

This direction is naturally selected so as to correspond to operation with the torque transmitted from one of the rotating parts to the other increasing, for which the elastically deformable arms tend to roll up.

These elastically deformable arms are not well suited to operation with the aforementioned torque decreasing, however, as this tends to cause them to unroll.

The general object of the present invention is to provide a device to overcome the aforementioned disadvantages.

SUMMARY OF THE INVENTION

The invention consists in a torsional damper suitable for use in a friction clutch plate, comprising at least two coaxial parts mounted to rotate relative to one another within a defined range of relative angular movement, and circumferentially acting elastic means between said parts resisting such relative angular movement over at least part of said range of relative angular movement, wherein said circumferentially acting elastic means comprise, associated with at least one direction of rotation, at least one elastically deformable arm, a support constrained to rotate with a first of said parts, and a shoulder formed on a second of said parts, and wherein said elastically deformable arm extends in a substantially circumferential direction, is attached at one end to said support, and is unrestricted at its other end, which is formed with a shoulder whereby it can engage with said shoulder on said second of said parts.

This arrangement implies an initial clearance between the free end of the elastically deformable arm and the shoulder with which it is intended to cooperate, the elastically deformable arm being systematically ineffective during the early stages of relative angular movement between the two rotating parts concerned.

Instead, it is effective only at the end of a first range of relative angular movement, so that throughout this range only circumferentially acting elastic means selected to present a lower value of stiffness are operative, without restriction.

When the invention is applied to a friction clutch plate, it is a simple matter to provide an elastically deformable arm for a first direction of rotation, corresponding to increasing torque, and a similar elastically deformable arm, separate to the first-mentioned arm, for the opposite direction of rotation, corresponding to decreasing torque.

For example, in a first embodiment of the invention the elastically deformable arms and their supports may be integral parts of an appropriately shaped flange.

Alternatively, and in a second embodiment of the invention, they may form parts of separate flanges.

In either case, assembly is a particularly simple matter.

Also in all cases the problem raised by the accommodation of the circumferentially acting elastic means is overcome in that the arrangement in accordance with the invention is essentially axial, a direction in which space is usually available, rather than radial, the more congested direction.

Furthermore, this arrangement has the advantage that it does not result in any weakening of the other components.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIGS. 11 to 14 are views similar to that of FIG. 6, showing alternative embodiments of the modular flange.

FIG. 15 is a side view along the arrow XV in FIG. 14 of the flange shown in FIG. 14.

FIG. 16 shows a blank from which the aforementioned flange may be formed.

DESCRIPTION OF THE PREFERRED EMBODIMENTS

Figure 1:
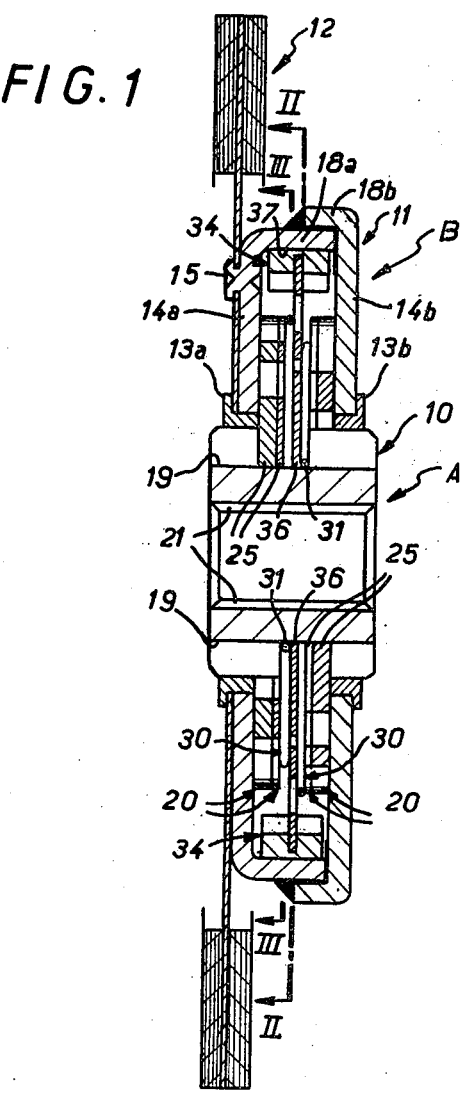
FIG. 1 is an axial cross-section on the line I—I in FIG. 2, showing a torsional damper in accordance with the invention.

In the drawings, the torsional damper to which the invention is applied constitutes a friction clutch plate for automotive vehicles incorporating a damper hub.

This type of friction clutch plate comprises at least two coaxial parts A and B, one driving and other driven, mounted to rotate relative to one another within a predetermined range of relative angular movement, against the action of circumferentially acting elastic means disposed between them.

In the embodiment shown in FIGS. 1 to 10, rotating part A comprises a tubular hub 10 and rotating part B comprises an annular casing 11 disposed around hub 10, with interposed bearings 13a, 13b, and supporting a friction disk 12.

In the embodiment shown, casing 11 is formed by two complementary annular shells 14a, 14b which have overlapping peripheral flanges 18a, 18b respectively, and which are attached together by welding along these peripheral flanges 18a, 18b.

The innermost shell 14a supports friction disk 12, which may be riveted thereto by means of integral rivets 15.

For reasons which will be explained later, peripheral flange 18a of shell 14a is formed with two pairs of openings 16, 16' at diametrically opposed positions, at which are formed tangs 17, 17', respectively, bent so as to project obliquely into the internal space in casing 11. In each pair of tangs 17, 17', tang 17 extends obliquely and circumferentially in a first direction while tang 17' associated therewith extends circumferentially and obliquely in the opposite direction.

As will be explained later, tangs 17 are designed to be effective for a first direction of rotation of the assembly, shown by the arrow F in FIGS. 2 and 3, being the direction in which they extend. Tangs 17' are designed to be effective for the opposite direction of rotation, again that in which they extend.

In a manner which is known per se, rotating part B is designed to be engaged with a first shaft, in practice a driving shaft, so as to rotate therewith, by clamping friction disk 12 between two plates rotating with the aforementioned shaft (not shown in the drawings).

Similarly, hub 10 constituting rotating part A is designed to be engaged with a second shaft, in practice a driven shaft, so as to rotate therewith, being provided to this end with internal splines 21 in the embodiment as shown in FIGS. 1 to 10.

Externally, and for reasons which will be explained later, in the embodiment shown in FIGS. 1 to 10 hub 10 is formed with two slots or axial grooves 19 at diametrically opposed positions, each of which is trapezoidal in transverse cross-section, to provide a dovetail type engagement facility.

In the embodiment shown in FIGS. 1 to 10, the circumferentially acting elastic means disposed between rotating parts A and B comprise an axial stack of modular flanges 20.

Figure 6:
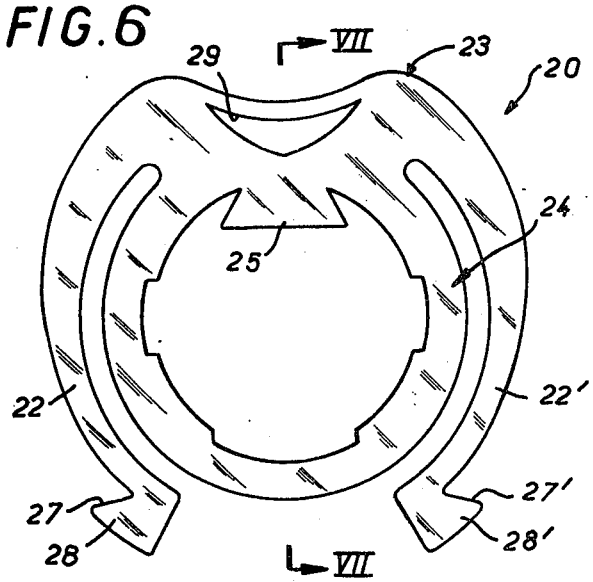
FIG. 6 shows one of the modular flanges used in the torsional damper in accordance with the invention to constitute the circumferentially acting elastic means, shown separately.
Figure 7:
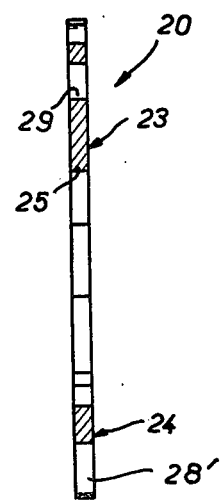
FIG. 7 is an axial cross-section through the modular flange on the line VII—VII in FIG. 6.
Figure 8:
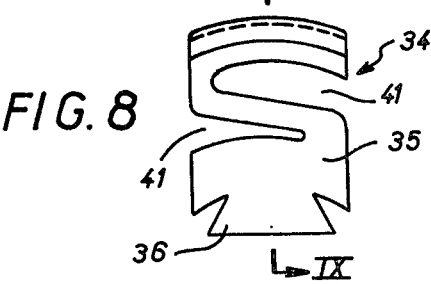
FIG. 8 shows another component of the torsional damper in accordance with the invention, shown separately.
Figure 9:
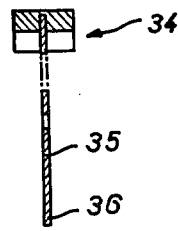
FIG. 9 is an axial cross-section through the aforementioned component on the line IX—IX in FIG. 8.

One such modular flange 20 is shown separately in FIGS. 6 and 7.

In the embodiment shown, this flange comprises two elastically deformable arms 22, 22', each integral at one end with a common support 23. From this support, each arm extends in a substantially circumferential direction, over slightly less than 180°, the two arms extending in opposite directions.

In this embodiment, support 23 comprises an annular member 24 with an internal perimeter which is adapted to bear on hub 10 at spaced locations, the external perimeter of said annular member 24 being separated from elastically deformable arms 22, 22' by a radial clearance. Support 23 further comprises a foot 25 extending radially from the internal perimeter of the annular member, the foot 25 being of generally trapezoidal contour complementary to the contour of the axial grooves 19 in hub 10 of rotating part B.

In the embodiment shown, there is a circumferential offset between foot 25 of support 23 for elastically deformable arms 22, 22', constituting the area in which same are attached to hub 10, and the area on each of said elastically deformable arms 22, 22' whereby the latter is attached to annular member 24 of support 23.

In accordance with the invention, at the end opposite support 23 elastically deformable arms 22, 22' of each modular flange 20 are unrestricted. Each is formed with a shoulder 27, 27' whereby it is enabled to engage with a shoulder formed for this purpose by the edges 26, 26' of tangs 17, 17' of rotating part B.

In the embodiment shown in FIGS. 1 to 10, the shoulder 27, 27' which each elastically deformable arm 22, 22' thus comprises is formed on an extension 28, 28' of the arm, extending radially outwards, and, for preference and as shown in the drawings, hook-shaped.

Finally, in the embodiment shown in FIGS. 1 to 10, support 23 of each modular flange 20 has an opening 29, in practice generally triangular in shape, in line with the corresponding foot 25.

In the embodiment shown in FIGS. 1 to 10, four modular flanges 20 are used, combined in pairs with different thicknesses in the axial direction.

Figure 2:
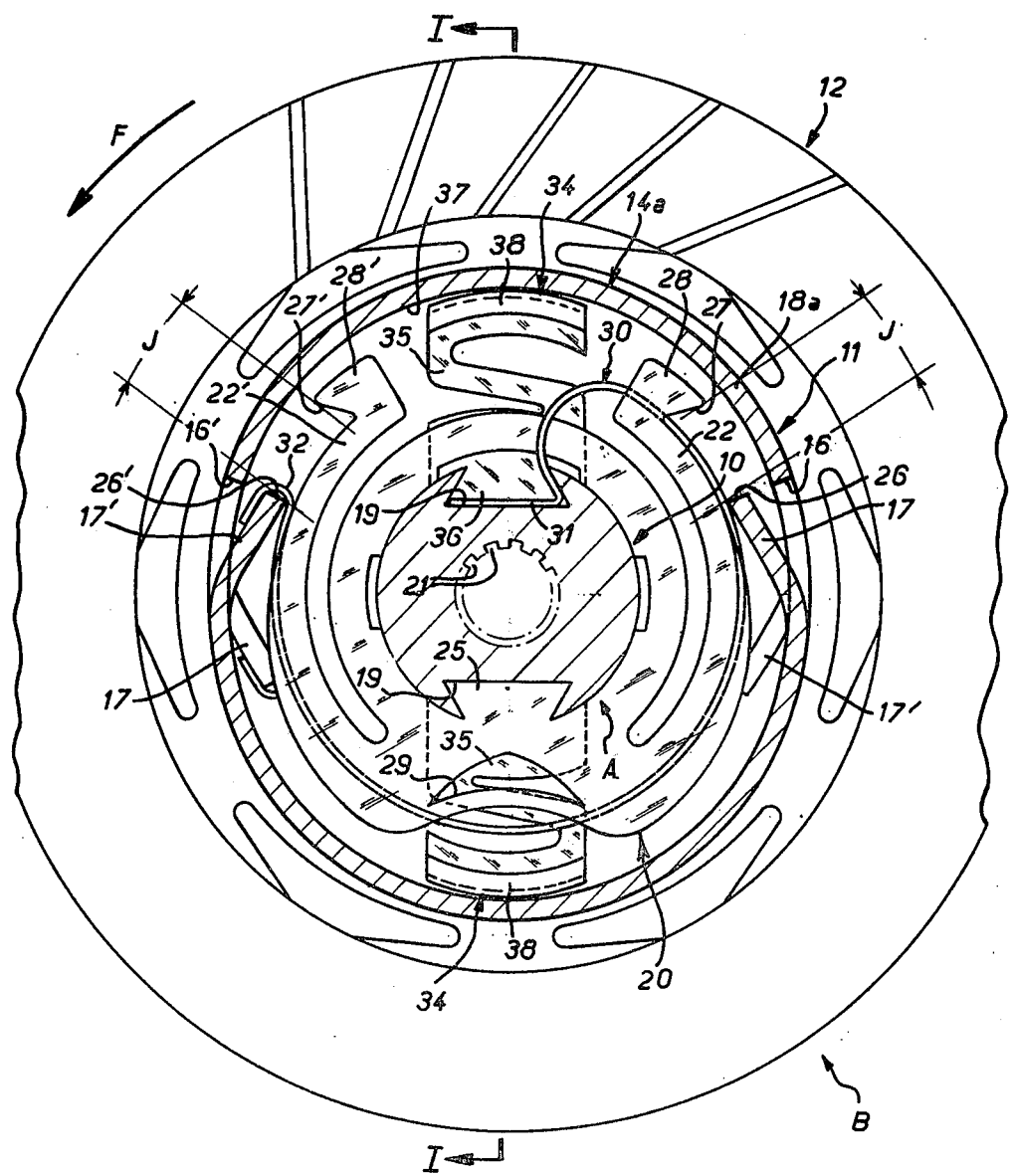
FIGS. 2 and 3 are transverse cross-sections through the torsional damper, on lines II—II and III—III, respectively, in FIG. 1.
Figure 3:
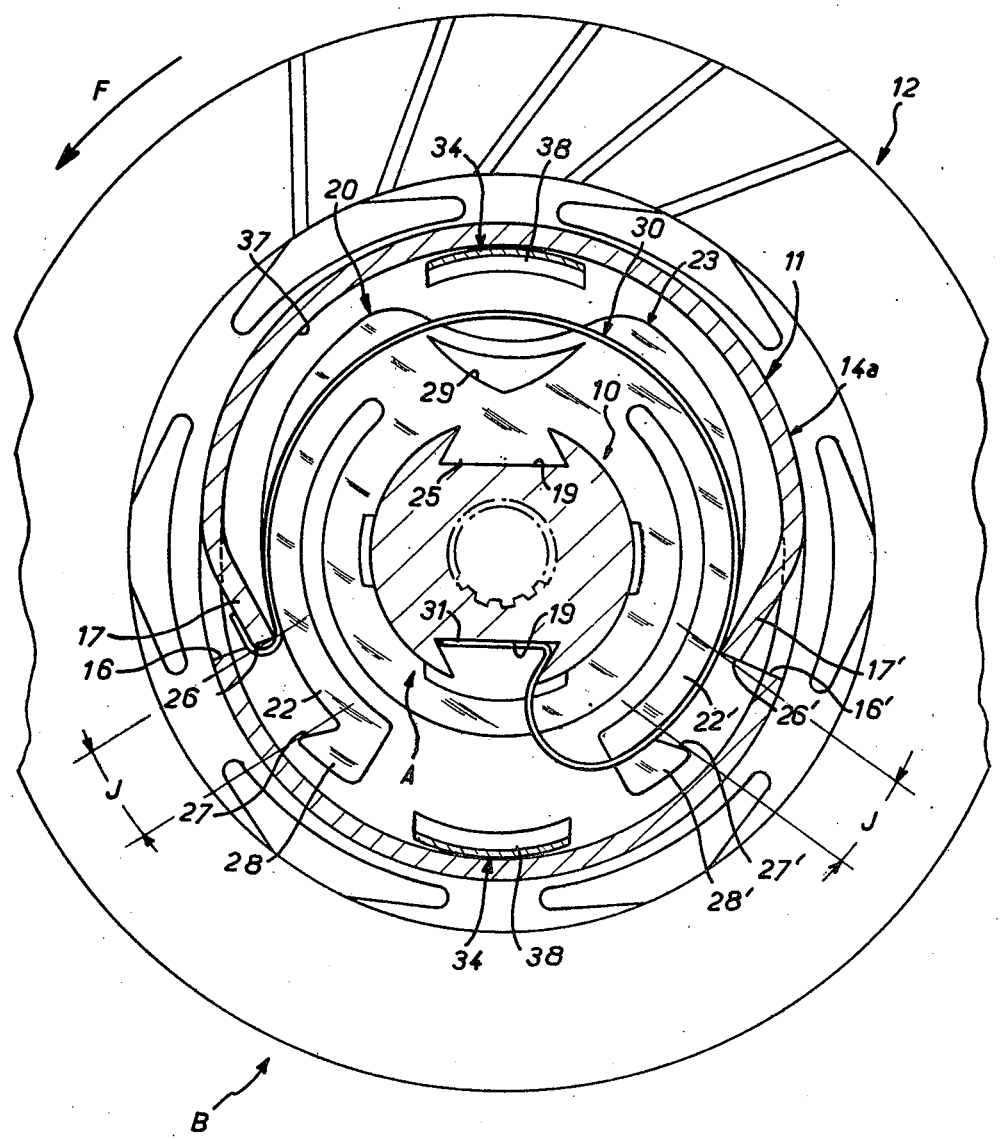

There is thus a first pair of two modular flanges 20 for which support foot 25 is engaged in a first of the axial grooves 19 in hub 10 and the elastically deformable arms 22, 22' of which are designed to cooperate with those of tangs 17, 17' of rotating part B which extend in the same general direction as the arms, towards their shoulder 27, 27' (FIGS. 1 and 3). There is also a second pair of modular flanges 20 with support foot 25 engaged in the other of the axial grooves 19 in hub 10, their elastically deformable arms 22, 22' being designed as previously to cooperate with those of tangs 17, 17' of rotating part B which extend in the same general direction as the arms, towards their shoulder 27, 27' (FIGS. 1 and 2).

Through their support foot 25, modular flanges 20 are all engaged with hub 10 of rotating part B and so constrained to rotate therewith.

In the rest configuration of the assembly, they are not permanently connected to rotating part B, their shoulders 27, 27' being circumferentially spaced from the corresponding tangs 17, 17' thereof. Thus during assembly all that is required is simple axial engagement of their support foot 25 on hub 10 of rotating part A.

In other words, there is an initial circumferential play J between shoulders 27, 27' of elastically deformable arms 22, 22' and the corresponding tangs 17, 17' of rotating part B.

In the embodiment shown, elastically deformable arms 22, 22' and support 25 of all modular flanges 20 are integral therewith, the flanges being shaped appropriately.

Figure 10:
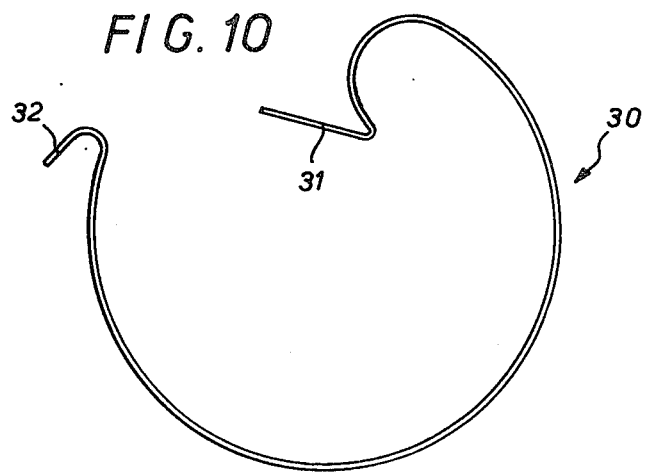
FIG. 10 shows a spring forming part of the torsional damper in accordance with the invention, shown separately.

In the embodiment shown in FIGS. 1 to 3, the circumferentially acting elastic means disposed between rotating part A and rotating part B further comprise two springs 30, one of which is shown in isolation in FIG. 10.

In accordance with the invention, spring 30 has one end shaped to form a foot 31 complementary with axial grooves 19 in hub 10, so as to be freely engaged in the axial direction in one of these grooves, like the stack of modular flanges 20. The other end is shaped to form a hook 32, the portion of the spring between these shaped ends subtending an angle of more than 180°.

In an arrangement in which they are diametrically opposed to one another, springs 30, like modular flanges 20, have their foot 31 engaged in a respective one of the axial slots 19 in hub 10. By their respective hooked ends 32, one is coupled to tang 17 of shell 14a of casing 11 (that furthest in the circumferential direction from axial slot 19 in hub 10 in which its foot 31 is engaged) and the other is coupled to the corresponding tang 17' of shell 14a, the two springs extending circumferentially in opposite directions.

Also operative between rotating parts A and B are friction means which, in the embodiment shown in FIGS. 1 to 3, comprise two friction pads 34 attached to hub 10 of rotating part A so as to rotate therewith and to provide rubbing engagement with an axial surface 37 rotating with rotating part B and formed by the internal surface of peripheral flange 18a of shell 14a of casing 11.

In the embodiment shown, the two friction pads 34 are disposed in diametrically opposite positions.

Each friction pad 34 comprises a curved friction lining 38 and a support 35 therefor.

In the embodiment shown, support 35 is formed by a flange extending transversely relative to the axis of the assembly, the end thereof opposite friction lining 38 forming a foot 36 of trapezoidal profile complementary to that of axial grooves 19 in hub 10.

In the embodiment shown, the flange constituting support 35 comprises notches 41 alternating between one of its radial edges and the other so that it is of generally S-shaped configuration, whereby it constitutes radially acting elastic means for maintaining the friction lining 38 which it carries applied against the associated axial surface 37.

It will be understood that friction pads 34 as implemented in the embodiment shown are responsive to centrifugal force.

When rotating part B is driven in rotation, in the direction shown by the arrow F in FIG. 2, for example, and when the torque to be transmitted from rotating part B to rotating part A is increasing, rotating part B drives rotating part A in rotation through the circumferentially acting elastic means disposed between it and rotating part A.

Initially, only that spring 30 which is attached to tang 17 of casing 11 extending circumferentially in the direction of rotation concerned is effective. Subsequently, when this tang 17 and the other tang 17' come into engagement with elastically deformable arm 22 of modular flange 20, when the initial circumferential play J has been taken up, modular flanges 20 are in turn effective, in combination with the spring 30 previously effective.

Friction pads 34 operate conjointly.

In practice, relative angular movement between rotating parts A and B is limited by elastically deformable arms 22, the stiffness of which increases with increasing relative angular movement, due in particular to the radial bearing engagement of these arms on the edge of annular member 24 of the corresponding support 23 along an arc which increases in length with increasing relative angular movement, by progressive absorption of the corresponding radial clearance.

When the torque to be transmitted from rotating part B to rotating part A is decreasing, the relative angular movement between said rotating parts is reversed and a process analogous to that described above takes place, the members effective this time, through tang 17' of shell 14a of casing 11, comprising first the other spring 30 and then elastically deformable arms 22' of modular flanges 20.

In both cases, elastically deformable arms 22, 22' contribute their elasticity, allowing for the radial clearance which separates them from annular member 24 of their support 23, within the limits indicated above.

It will be readily appreciated that the opening 29 in support 23 enhances its elasticity.

In the embodiment shown in FIG. 11, there is no annular member 24. Support 23 is formed with two bearing arms 39, 39', one on each side of foot 25. These extend in a generally circumferential direction around hub 23 and bear on part of the perimeter of the hub.

In the embodiment shown in FIG. 12 annular member 24 is present, but there is radial clearance between member 24 and hub 10 in the rest configuration of the assembly, as shown schematically in chain-dotted outline in FIG. 12.

Diametrically opposite foot 25 and projecting radially from the internal perimeter of annular member 24 is a second foot 40, engaged axially in the opposite slot 19 of hub 10, with circumferential play on each side.

Thus in addition to the effect of elastically deformable arms 22, 22' there is the effect of the elasticity of support 23 thereof, effective until annular member 24 comes to bear on hub 10 and/or foot 40 butts up against the corresponding flank of the slot 19 in hub 10 in which it is engaged.

In the embodiment shown in FIG. 13, modular flange 20 comprises a single elastically deformable arm 22 extending circumferentially through more than 180° from foot 25, in practice and as shown extending over slightly less than 360°.

It will be appreciated that with this flange, which is effective for one direction of rotation only, there is associated a similar flange with its circumferential arm 22' extending in the opposite circumferential direction (not shown), and effective for the opposite direction of rotation.

Circumferential arm 22 or 22' preferably extends in a spiral configuration so that there is an increasing radial clearance between it and hub 10, from foot 25 of its support 23 to its free end, in the rest configuration of the assembly.

Thus with the device in service the capability of this arm for elastic deformation is progressively reduced as, due to relative angular movement between rotating parts A and B, an increasingly longer portion of the arm comes into contact with the perimeter of hub 10.

In the embodiment shown in FIGS. 14 and 15, two elastically deformable arms 22, 22' extending spirally over more than 180° are associated with a common support 23.

Thus these two elastically deformable arms 22, 22' extend in a generally helical configuration which is continuous.

FIG. 16 shows a suitable shape for a blank which, by being wound around an axis perpendicular to its own plane and substantially aligned with foot 25, provides a modular flange 20 of the required shape.

The advantage of this type of modular flange is its great flexibility.

Also, as it may be stamped out from a continuous reel of metal tape, as indicated schematically in chain-dotted outline in FIG. 16, it can be fabricated relatively inexpensively.

Figure 17:
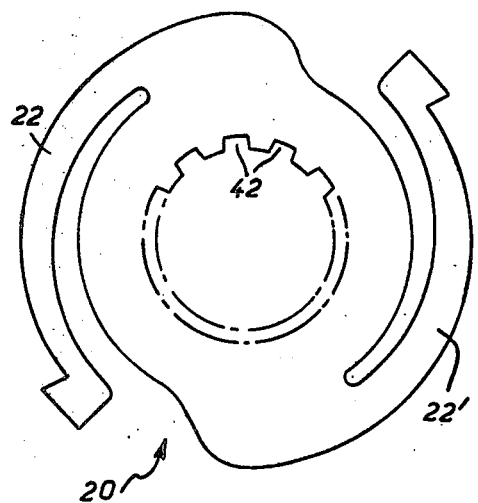
FIG. 17 is a further view analogous to that of FIG. 6, showing a further embodiment of the modular flange.

In the embodiment shown in FIG. 17, modular flange 20 has two elastically deformable arms 22, 22' of the same kind, that is to say extending in the same circumferential direction and thus acting conjointly for the same direction of rotation.

It will be understood that a similar modular flange (not shown) having elastically deformable arms extending in the opposite direction must also be used in this case, for the other direction of rotation.

In this embodiment, the means whereby the support of an elastically deformable arm is freely engaged with hub 10 comprise notches 42, instead of a dovetail shaped foot for a dovetail connection. Naturally, the outer perimeter of hub 10 is in this case formed with complementary splines (not shown in the drawings).

Throughout the foregoing description it has been assumed that the rotary coupling of hub 10 constituting rotating part A to the associated driven shaft was by means of a splined engagement, the internal perimeter of the hub and the external perimeter of the shaft being both generally circular in this case.

This is not necessarily the case.

Figure 18:
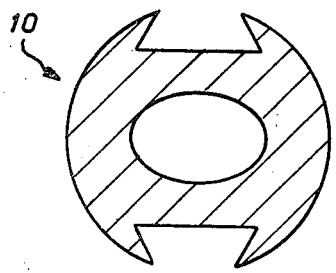
FIG. 18 is a view analogous to that of FIG. 4, showing an alternative embodiment of the hub.
Figure 4:
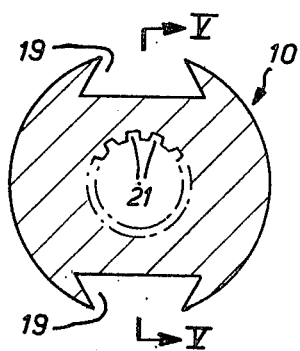
FIG. 4 is a transverse cross-section on the line IV—IV in FIG. 5, through the hub used in the torsional damper, shown separately.
Figure 5:
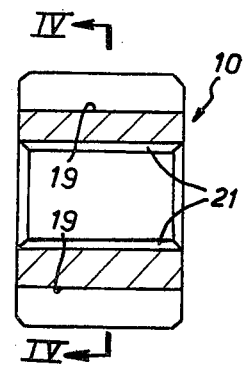
FIG. 5 is an axial cross-section through the aforementioned hub on the line V—V in FIG. 4.

As an alternative, and as shown in FIG. 18, the inner perimeter of hub 10 may be of generally oval shape, designed to engage on a complementary driven shaft.

It will be understood that various changes in the details, materials and arrangements of parts, which have been herein described and illustrated in order to explain the nature of the invention, may be made by those skilled in the art within the principle and scope of the invention as expressed in the appended claims.

Specifically, the elastically deformable arms need not necessarily have the same stiffness for the directions of rotation corresponding to increasing and decreasing torque, respectively.

In this case, modular flanges with a single arm are used, these arms having different thickness in the axial direction. Alternatively, the two arms of the same modular flange may be cut out to a different shape.

In other words, where a modular flange in accordance with the invention comprises two arms, these are not necessarily symmetrical relative to a plane containing the axis of the flange.

Modular flanges of this kind are preferably associated in pairs, and disposed in diametrically opposite positions, as described hereinabove, to avoid the generation of a radial component of elasticity, except where such a component is required for a specific application.

Moreover, as the specially shaped springs come into operation first, the modular flanges may be replaced by conventional elastic means, such as coil springs or blocks of elastic material, for example.

The application of the invention is not limited to the case in which the torsional damper comprises only two rotating parts, but extends to all cases in which there is a larger number of coaxial parts disposed to rotate in pairs.

Finally, the application of the invention is not limited to friction clutch plates for automotive vehicles, but extends generally to all types of torsional damper.

I claim:

1. A torsional damper for use in a friction clutch plate, said torsional damper comprising at least two coaxial parts mounted for relative rotation within a defined range of relative angular movement, circumferentially acting elastic means operatively disposed between said coaxial parts and resisting relative angular movement over at least part of said range of relative angular movement, said circumferentially acting elastic means comprising a circumferentially acting spring having one end in engagement with one of said coaxial parts and another end coupled to the other of said coaxial parts, said circumferentially acting spring being operative at the outset of relative angular movement, said circumferentially acting elastic means further comprising at least one elastically deformable arm, a support constrained to rotate with a first of said coaxial parts, a shoulder formed on a second of said coaxial parts, said elastically deformable arm extending in a substantially circumferential direction and attached at one end to said support, the other end of said elastically deformable arm having a shoulder being circumferentially spaced from said shoulder on said second coaxial part at the outset of relative angular displacement of said coaxial parts, whereby said shoulders come into engagement with each other and said elastically deformable arm becomes operative after a predetermined range of relative angular movement between said coaxial parts, said elastically deformable arm and said support being parts of a flange of one-piece construction, wherein said first coaxial part comprises a hub and said support comprising a foot in engagement with said hub, said support further comprising two bearing arms extending in opposite directions from said foot and circumferentially around and bearing against said hub.

2. The torsional damper according to claim 1, wherein said shoulder is formed on a radially outward projection at said other end of said elastically deformable arm.

3. The torsional damper according to claim 2, wherein said projection is hook-shaped.

4. The torsional damper according to claim 1, wherein the elastically deformable arm subtends an angle more than 180° from said foot.

5. The torsional damper according to claim 1, wherein said support is apertured in radial alignment with said foot.

6. The torsional damper according to claim 1, wherein said elastically deformable arm is of helical configuration.

7. The torsional damper according to claim 1, wherein said one circumferentially extending spring comprises an arcuate elastically deformable arm.

8. A torsional damper for use in a friction clutch plate, said torsional damper comprising at least two coaxial parts mounted for relative rotation within a defined range of relative angular movement, circumferentially acting elastic means operatively disposed between said coaxial parts and resisting relative angular movement over at least part of said range of relative angular movement, said circumferentially acting elastic means comprising a circumferentially acting spring having one end in engagement with one of said coaxial parts and another end coupled to the other of said coaxial parts, said circumferentially acting spring being operative at the outset of relative angular movement, said circumferentially acting elastic means further comprising at least one elastically deformable arm, a support constrained to rotate with a first of said coaxial parts, a shoulder formed on a second of said coaxial parts, said elastically deformable arm extending in a substantially circumferential direction and attached at one end to said support, the other end of said elastically deformable arm having a shoulder being circumferentially spaced from said shoulder on said second coaxial part at the outset of relative angular displacement of said coaxial parts, whereby said shoulders come into engagement with each other and said elastically deformable arm becomes operative after a predetermined range of relative angular movement between said coaxial parts, said elastically deformable arm and said support are parts of a flange of one-piece construction, said first coaxial part comprising a hub and said support comprising a foot in engagement with said hub, said support further comprising an annular member having an internal perimeter from which said foot projects, radial clearance being defined between said elastically deformable arm and said annular member.

9. The torsional damper according to claim 8, wherein said annular member bears against said hub along at least part of said internal perimeter.

10. The torsional damper according to claim 8, wherein said hub has a groove and said annular member comprises a second foot, disposed diametrically opposite the first-mentioned foot and projecting from said internal perimeter, said second foot being received in said groove with circumferential play to each side thereof.

11. The torsional damper according to claim 8, wherein said shoulder is formed on a radially outward projection at said other end of said elastically deformable arm.

12. The torsional damper according to claim 8, wherein said support is apertured in radial alignment with said foot.

13. The torsional damper according to claim 8, wherein said elastically deformable arm is of helical configuration.

14. The torsional damper according to claim 8, wherein said one circumferentially extending spring comprises an arcuate elastically deformable arm.

15. A torsional damper for use in a friction clutch plate, said torsional damper comprising at least two coaxial parts mounted for relative rotation within a defined range of relative angular movement, circumferentially acting elastic means operatively disposed between said coaxial parts and resisting relative angular movement over at least part of said range of relative angular movement, said circumferentially acting elastic means comprising a circumferentially acting spring having one end in engagement with one of said coaxial parts and another end coupled to the other of said coaxial parts, said circumferentially acting spring being operative at the outset of relative angular movement, said circumferentially acting elastic means further comprising at least one elastically deformable arm, a support constrained to rotate with a first of said coaxial parts, a shoulder formed on a second of said coaxial parts, said elastically deformable arm extending in a substantially circumferential direction and attached at one end to said support, the other end of said elastically deformable arm having a shoulder being circumferentially spaced from said shoulder on said second coaxial part at the outset of relative angular displacement of said coaxial parts, whereby said shoulders come into engagement with each other and said elastically deformable arm becomes operative after a predetermined range of relative angular movement between said coaxial parts, and there being two of said elastically deformable arms, said elastically deformable arms extending in circumferentially opposite directions and being formed in a one-piece flange together with said support therefor.

16. The torsional damper according to claim 15, wherein each of said deformable arms is of helical configuration.

17. The torsional damper according to claim 15, wherein said shoulder is formed on a radially outward projection at said other end of each of said elastically deformable arms.

18. The torsional damper according to claim 15, wherein said support is apertured in radial alignment with said foot.

19. The torsional damper according to claim 15, wherein said one circumferentially extending spring comprises an arcuate elastically deformable arm.

* * * * *